US00RE45079E

(19) United States
(12) Reissued Patent
Ferlise

(10) Patent Number: US RE45,079 E
(45) Date of Reissued Patent: Aug. 19, 2014

(54) EXPANDABLE WIRE BANGLE BRACELET

(75) Inventor: Carolyn Rafaelian Ferlise, Providence, RI (US)

(73) Assignee: Alex and Ani, LLC, Cranston, RI (US)

(21) Appl. No.: 29/407,021

(22) Filed: Nov. 22, 2011

Related U.S. Patent Documents

Reissue of:
(64) Patent No.: Des. 487,709
Issued: Mar. 23, 2004
Appl. No.: 29/181,844
Filed: May 16, 2003

(51) LOC (10) Cl. ..... 11-01
(52) U.S. Cl.
USPC ..... D11/5
(58) Field of Classification Search
USPC ..... D11/1–15, 18, 19, 20, 22, 23, 24, 25, D11/93; 63/3, 4, 9, 38, 3.2
See application file for complete search history.

(56) References Cited

U.S. PATENT DOCUMENTS

| | | | | | |
|---|---|---|---|---|---|
| 14,438 | A | | 11/1883 | Ahn | |
| 393,239 | A | * | 11/1888 | Johnstone | D11/10 |
| 421,615 | A | | 2/1890 | Riker | |
| 1,043,063 | A | * | 11/1912 | Cahoone | 63/3 |
| D152,434 | S | * | 1/1949 | Pizzano et al. | D11/2 |
| D224,257 | S | * | 7/1972 | Lee | D11/4 |
| D245,834 | S | | 9/1977 | Wilbert | |
| D247,482 | S | * | 3/1978 | Schupp | D11/4 |
| 5,247,814 | A | | 9/1993 | McDonald | |
| D386,999 | S | * | 12/1997 | Kothari | D11/4 |
| D446,146 | S | * | 8/2001 | Cevallos | D11/3 |
| D446,147 | S | * | 8/2001 | Cevallos | D11/5 |
| D452,456 | S | * | 12/2001 | Cabarbaye | D11/3 |
| D460,373 | S | * | 7/2002 | Cabarbaye | D11/3 |

OTHER PUBLICATIONS

Richard M. Garbarini, Complaint and Jury Demand filed on Jun. 11, 2010 in the Southern District of New York, pp. 1-26.

Robert H. Morse, Answer and Counterclaims filed on Jul. 7, 2010 in the the Southern District of New York, pp. 1-11.

Richard M. Garbarini, First Amended Complaint and Jury Demand dated Jun. 7, 2010, pp. 1-12.

(Continued)

*Primary Examiner* — Phillip S Hyder
(74) *Attorney, Agent, or Firm* — Edward Wildman Palmer LLP; Maria A. Scungio; David J. Silva

(57) CLAIM

The ornamental design for an expandable wire bangle bracelet, as shown and described.

DESCRIPTION

FIG. 1 is a perspective view of an expandable bangle bracelet, showing my new design;
FIG. 2 is a top plan view thereof;
FIG. 3 is a bottom view thereof;
FIG. 4 is a left side view thereof;
FIG. 5 is a right side view thereof;
FIG. 6 is a rear view thereof; *and,*
FIG. 7 is a front view thereof[;].
[FIG. 8 is a perspective view of a second embodiment of my design; and,]
[FIG. 9 is a perspective view of a third embodiment of my design.]
[The subject matter depicted in dashed lines in FIG. 9 is shown for illustrative purposes only and forms no part of the claimed design.]

1 Claim, 7 Drawing Sheets

Figure 1:
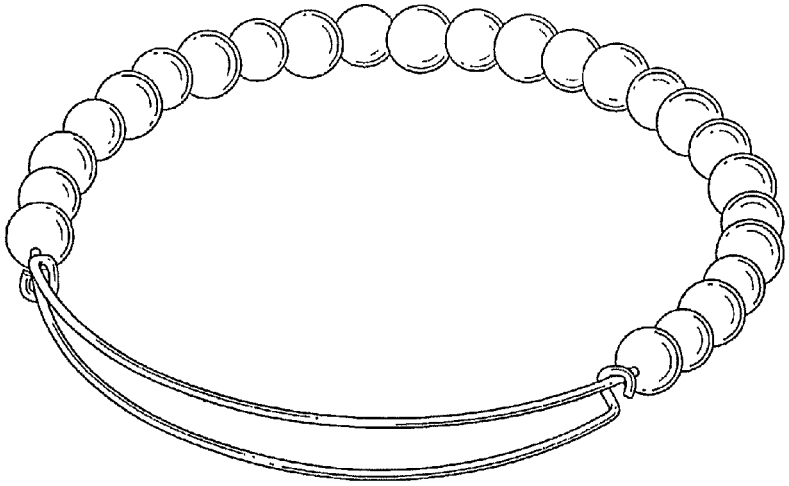
Figure 2:
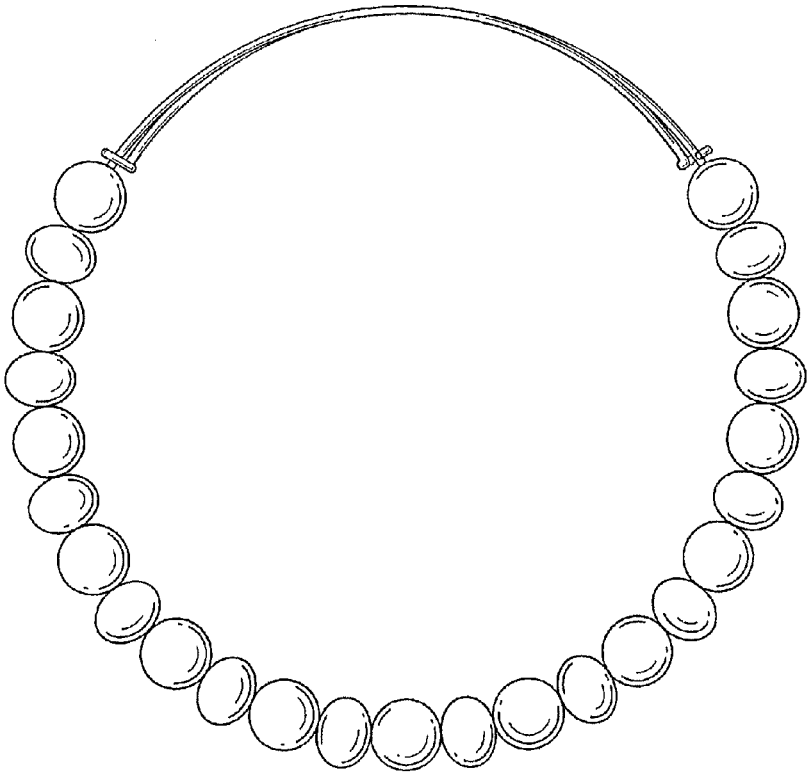
Figure 3:
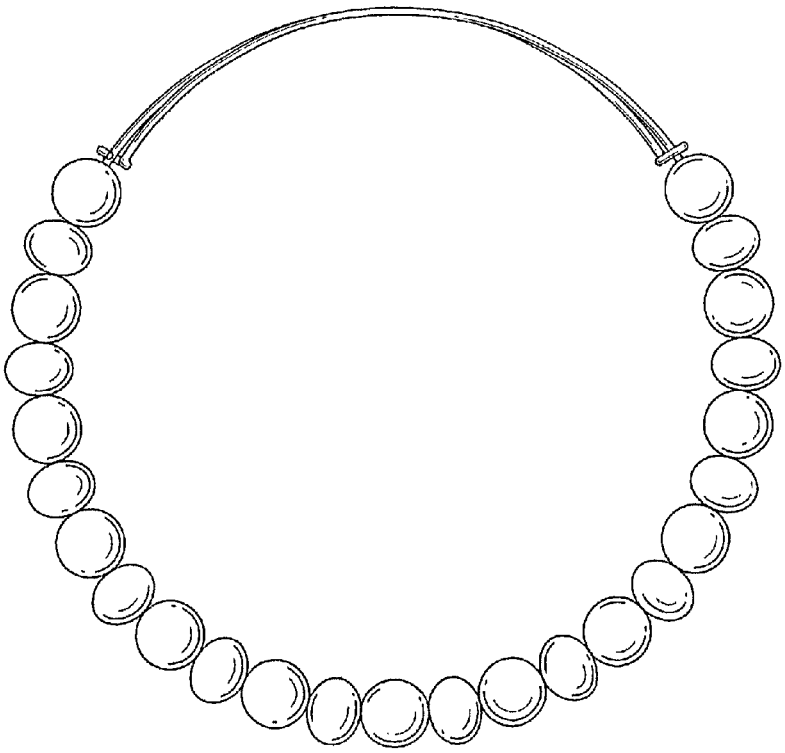
Figure 4:
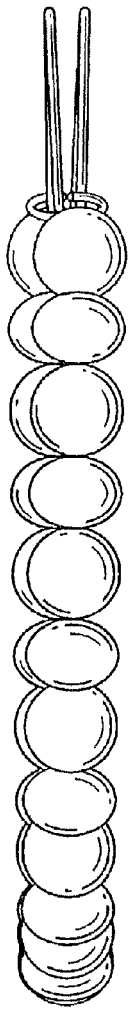
Figure 5:
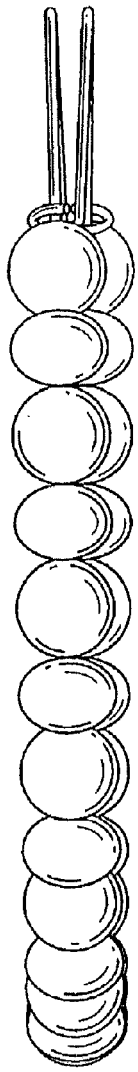
Figure 6:
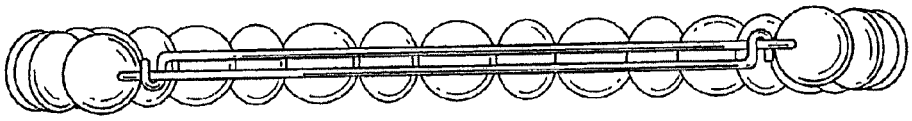
Figure 7:
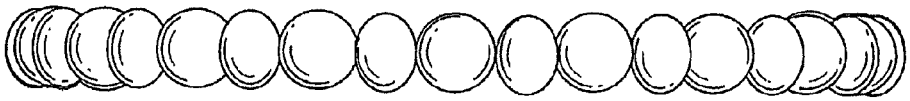

Matter enclosed in heavy brackets [ ] appears in the original patent but forms no part of this reissue; matter printed in italics indicates the additions made by reissue.

(56) References Cited

OTHER PUBLICATIONS

Robert H. Morse, Amended Answer and Counter Claims to First Amended Complaint filed on Jul. 27, 2010 in the the Southern District of New York, pp. 1-9.
Robert H. Morse, Exhibit 1 to Amended Answer and Counter Claims to First Amended Complaint filed on Jul. 27, 2010 in the the Southern District of New York, pp. 1-9; includes U.S. Patent No. D498,167 (a child patent claiming priority to the patent of the subject reissue application).
Robert H. Morse, Exhibit 2 to Amended Answer and Counter Claims to First Amended Complaint filed on Jul. 27, 2010 in the the Southern District of New York, pp. 1-3; includes U.S. Patent No. 421,615.
Robert H. Morse, Exhibit 3 to Amended Answer and Counter Claims to First Amended Complaint filed on Jul. 27, 2010 in the the Southern District of New York, pp. 1-3; includes a jewelry catalogue from The Hoffman Jewelry Company of Columbus, OH dated 1909-1910, pp. 1-4.
Richard M. Garbarini, Reply to Counterclaims of Defendant MOA International Corp. filed Aug. 4, 2010 in the Southern District of New York, pp. 1-6.
Robert H. Morse, Letter to the Hon. Kimba M. Wood of the Southern District of New York, dated Jul. 21, 2010, pp. 1-24; includes the above-mentioned Exhibits 1-3.
Kimba M. Wood, Order in response to Defendants' Letter of Jul. 21, 2010, dated Aug. 9, 2010, pp. 1-2.
Richard M. Garbarini, Plaintiff's Responses to Defendant's Rule 56.1 Statement filed Aug. 13, 2010 filed in the Southern District of New York, pp. 1-12; includes U.S. Patent No. 498,167 (a child patent claiming priority to the patent of the subject reissue application).
Robert H. Morse, Response to Plaintiff's Rule 56.1 Statement and Argument filed Aug. 20, 2010 in the Southern District of New York, pp. 1-8.
Kalpana Nagampalli, Declaration of Kalpana Nagampalli dated Aug. 20, 2010 filed in the Southern District of New York in support of Defendant's Response to Plaintiff's Rule 56.1 Statement, pp. 1-2.
Robert H. Morse, Exhibit A to Defendant's Response to Plaintiff's Rule 56.1 Statement and Argument filed Aug. 20, 2010, pp. 1-2; includes a web page published by Alex and Ani, Inc.
Robert H. Morse, Exhibit B to Defendant's Response to Plaintiff's Rule 56.1 Statement and Argument filed Aug. 20, 2010, pp. 1-2; includes pictures of bracelets.
Robert H. Morse, Exhibit C to Defendant's Response to Plaintiff's Rule 56.1 Statement and Argument filed Aug. 20, 2010, pp. 1-2; includes U.S. Patent No. Des. 245,834.
Robert H. Morse, Exhibit D to Defendant's Response to Plaintiff's Rule 56.1 Statement and Argument filed Aug. 20, 2010, pp. 1-2; includes a web page published by Alex and Ani, Inc.
Kalpana Nagampalli, Memorandum of Law in Support of Defendant's Motion for Summary Judgment filed Feb. 18, 2011 in the Southern District of New York, pp. 1-30.
Kalpana Nagampalli, Exhibits in support of the Memorandum of Law in Support of Defendant's Motion for Summary Judgment filed Feb. 18, 2011 in the Southern District of New York, pp. 1-29; includes U.S. Patent No. D498,167 (Ex. A), Declaration of Robert H. Morse (Ex. B), U.S. Patent No. 14,438 (Ex. 1), U.S. Patent No. 421,615 (Ex. 2), John V. Farwell Company Jewelry, Diamonds and Watches Catalog dated 1908-1909 (Ex. 3), The Hoffman Jewelry Company Wholesale Jewelry Catalogue No. 27 dated.
Bradley S. Corsello, Plaintiff's Memorandum of Law in Opposition to Defendant's Proposed Motion for Summary Judgment filed Feb. 28, 2011, pp. 1-19.
Carolyn Rafaelian, Declaration of Carolyn Rafaelian in Support of Plaintiff's Memorandum of Law in Opposition to Defendant's Proposed Motion for Summary Judgment filed Feb. 28, 2011, pp. 1-8.
Carolyn Rafaelian, Exhibit A Part 1 of Declaration of Carolyn Rafaelian in support of Plaintiff's Memorandum of Law in Opposition to Defendant's Proposed Motion for Summary Judgment filed Feb. 28, 2011, pp. 1-6; includes magazines showcasing Alex and Ani bracelets.
Carolyn Rafaelian, Exhibit A Part 2 of Declaration of Carolyn Rafaelian in support of Plaintiff's Memorandum of Law in Opposition to Defendant's Proposed Motion for Summary Judgment filed Feb. 28, 2011, pp. 1-5; includes magazines showcasing Alex and Ani bracelets.
Carolyn Rafaelian, Exhibit A Part 3 of Declaration of Carolyn Rafaelian in support of Plaintiff's Memorandum of Law in Opposition to Defendant's Proposed Motion for Summary Judgment filed Feb. 28, 2011, pp. 1-6; includes magazines showcasing Alex and Ani bracelets.
Carolyn Rafaelian, Exhibit A Part 4 of Declaration of Carolyn Rafaelian in support of Plaintiff's Memorandum of Law in Opposition to Defendant's Proposed Motion for Summary Judgment filed Feb. 28, 2011, pp. 1-4; includes magazines showcasing Alex and Ani bracelets.
Carolyn Rafaelian, Exhibit A Part 5 of Declaration of Carolyn Rafaelian in support of Plaintiff's Memorandum of Law in Opposition to Defendant's Proposed Motion for Summary Judgment filed Feb. 28, 2011, pp. 1-5; includes magazines advertising Alex and Ani bracelets.
Carolyn Rafaelian, Exhibit B of Declaration of Carolyn Rafaelian in support of Plaintiff's Memorandum of Law in Opposition to Defendant's Proposed Motion for Summary Judgment filed Feb. 28, 2011, pp. 1-2; includes a PR Newswire about Carolyn Rafaelian and Alex and Ani, Inc.
Dr. Victoria Tillotson, Declaration of Expert Witness Dr. Victoria Tillotson in Support of Plaintiff's Memorandum of Law in Opposition to Defendant's Proposed Motion for Summary Judgment filed Feb. 28, 2011, pp. 1-8.
Dr. Victoria Tillotson, Exhibit A of Declaration of Expert Witness Dr. Victoria Tillotson in support of Plaintiff's Memorandum of Law in Opposition to Defendant's Proposed Motion for Summary Judgment filed Feb. 28, 2011, pp. 1-3; includes the resume of Dr. Victoria Tillotson.
Dr. Victoria Tillotson, Exhibit B of Declaration of Expert Witness Dr. Victoria Tillotson in support of Plaintiff's Memorandum of Law in Opposition to Defendant's Proposed Motion for Summary Judgment filed Feb. 28, 2011, pp. 1-2; U.S. Patent No. 421,615.
Dr. Victoria Tillotson, Exhibit C of Declaration of Expert Witness Dr. Victoria Tillotson in support of Plaintiff's Memorandum of Law in Opposition to Defendant's Proposed Motion for Summary Judgment filed Feb. 28, 2011, pp. 1-3; includes an article entitled Four Centuries of Silver by Margaret Duda.
Dr. Victoria Tillotson, Exhibit D of Declaration of Expert Witness Dr. Victoria Tillotson in support of Plaintiff's Memorandum of Law in Opposition to Defendant's Proposed Motion for Summary Judgment filed Feb. 28, 2011, pp. 1-8; includes U.S. Patent No. 245,834.
Dr. Victoria Tillotson, Exhibit E of Declaration of Expert Witness Dr. Victoria Tillotson in support of Plaintiff's Memorandum of Law in Opposition to Defendant's Proposed Motion for Summary Judgment filed Feb. 28, 2011, pp. 1-10; includes pages from the Hoffman Jewelry Company Jewelry Catalogue dated 1909-1910.
Hon. Kimba M. Wood, Order in response to Defendant's Motion for Summary Judgment dated Sep. 6, 2011, pp. 1-2.
Robert H. Morse, Letter to the Hon. Kimba M. Wood in the Southern District of New York dated Aug. 10, 2010, pp. 1-6.
Richard M. Garbarini, Letter to the Hon. Kimba M. Wood in response to Defendant's Response to Plaintiff's Rule 56.1 Statement and Argument, dated Aug. 13, 2010, pp. 1-18.
Richard M. Garbarini, Letter to the Hon. Kimba M. Wood in response to Defendant's Response to Plaintiff's Rule 56.1 Statement and Argument, dated Aug. 23, 2010, pp. 1-3.
Excerpts from "World of Bracelets", 4 pages.
E.V. Roddin & Co. Catalog, 1888, Chicago, Ill., 3 pages.
E.V. Roddin & Co., Jewelry, Watches and Silverware Catalog, 1895, 6 pages.
Otto Young Catalog, 1892, 3 pages.
New England Jewelry Catalog, "Illustrated Jewelry Catalog 1892", 5 pages.
Hinks, Peter, "Victorian Jewelry—An Illustrated Collection of Exquisite 19th-Century Jewelry", 1991, 13 pages.
Civil Action Case No. 1:14-cv-10104-MLW—Non Patent Literature Document #27, 1 page.
Hinks, Peter, "Victorian Jewellery A Complete Compendium of over four thousand pieces of Jewellery", 1991.

* cited by examiner